Aug. 13, 1963 G. ALMASHY 3,100,643
EDUCATIONAL GAME APPARATUS
Filed July 28, 1961
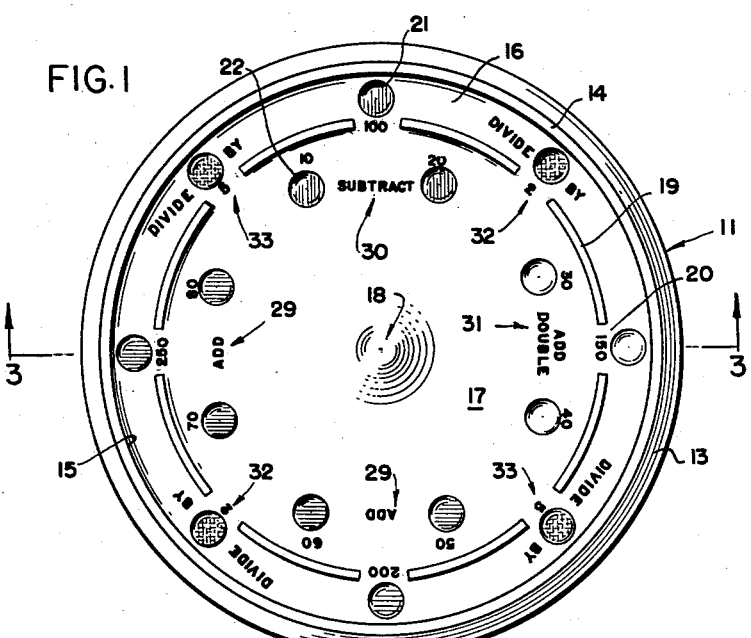
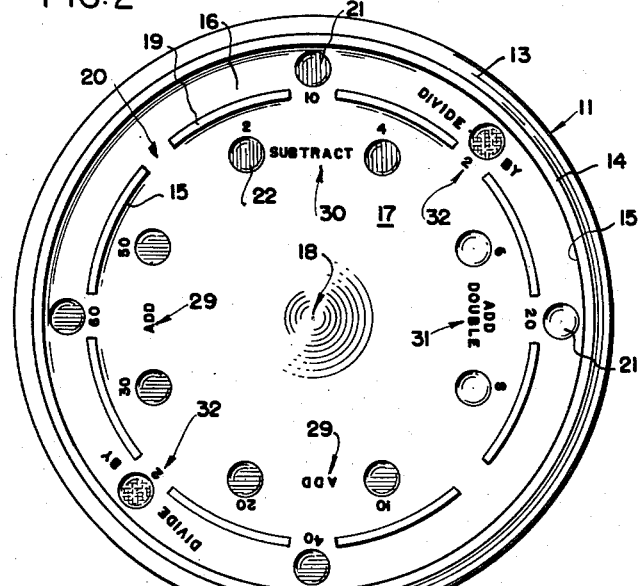
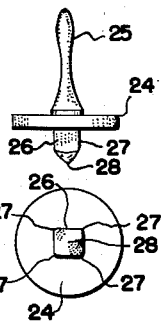
INVENTOR.
GEORGE ALMASHY.
BY
Robert G. Sloman
ATTORNEY.

3,100,643
EDUCATIONAL GAME APPARATUS
George Almashy, Brighton, Mich.
Filed July 28, 1961, Ser. No. 127,602
2 Claims. (Cl. 273—119)

This invention relates to an educational game apparatus, and more particularly to a toy which includes a circular base platform with a tapered centrally depressed playing surface upon which a spinner may be rotated, and upon which a series of balls may be dropped for operative engagement by the spinner for projecting the said balls into variably located depressions in the playing surface.

It is an object of the present invention to provide a novel form of educational game apparatus which incorporates upon a base an annular playing surface which is depressed within a peripheral rim and which is also tapered downwardly towards the center thereof to receive a manually rotated spinner upon which a series of balls may be dropped, which will roll down the inclined playing surface towards its center, for operative engagement with the spinner and for projection thereby into a series of variably located depressions formed in the playing surface.

It is another object of the present invention to incorporate into the educational game apparatus various designations for the various groups of depressions formed in the playing surface in order to assist the child in certain mathematical functions, as for example, adding, subtracting, multiplying and dividing.

It is a further object of the present invention to provide upon and within and down into the playing surface, a series of groups of hemispherical depressions with indicia provided for identifying the particular groups as to mathematical function, and with numerical indicia applied to the playing surface adjacent the individual depressions to give the child the opportunity of combining figures, as in adding, subtracting, doubling numbers, or in dividing.

It is a further object of the present invention to provide in conjunction with the educational game apparatus a means by which the child or adult can keep score and receive a mark, depending upon the extent of the score kept.

These and other objects will be seen from the following specification and claims in conjunction with the appended drawing in which:

FIG. 1 is a plan view of the present game apparatus base platform with ball receiving depressions formed therein.

FIG. 2 is a similar view of a slightly different form of base platform with modified indicia.

FIG. 3 is a section taken on line 3—3 of FIG. 1.

FIG. 4 is an elevational view of the spinner employed.

FIG. 5 is a bottom plan view thereof.

FIG. 6 illustrates the balls employed with the game apparatus.

It will be understood that the above drawing illustrates merely a preferred embodiment of the invention, and that other embodiments are contemplated with the scope of the claims hereafter set forth.

Referring to the drawing, the present game apparatus includes a circular base platform 11 having a flat undersurface 12, and an annular side edge 13, which is inclined upwardly and inwardly, slightly terminating in the peripheral rim 14.

The peripheral rim includes an annular upright surface 15, at the base of which there is provided the annular tapered playing surface 16—17, which covers the top of the base platform and extends inwardly and downwardly from the base of the said rim 15 terminating in the central depressed portion 18.

A series of spaced upright arcuate dividers 19 are arranged in a circle upon the said playing surface 16—17 being spaced apart as indicated at 20, a distance which is substantially greater than the diameter of the balls 23, which were used as a part of the game apparatus and which are shown in FIG. 6.

As shown in the drawing, particularly FIGS. 1 and 2, the said dividers 19 are spaced radially inward from the rim 14. A series of hemispherically shaped depressions 21 are formed into the said playing surface and arranged between the rim 14 and the said dividers 19, being arranged in a circle. Each of the said depressions 21 is located radially outwardly of the spaces 20 between the ends of the respective dividers 19. Accordingly it is seen that the said spaces 20 provide a passageway through which the balls 23 may be projected for nesting within one of the depressions 21.

A second series of hemispherically shaped depressions 22 are formed within the said playing surface, being arranged radially inward of central portions of the dividers 19, and also being arranged in a circle, as shown in the drawing.

As a part of the present game apparatus, there is provided as shown in FIGS. 4 and 5, a manually rotatable spinner 25, which includes intermediate its ends the annular balancing disc 24 and depending centrally therefrom a polygonally shaped support 26, which includes pairs of spaced upright edges 27.

The lower end of the support comes to a tapered point as at 28 for cooperative registry with the playing surface 17, at a central portion at 18. In the event that the member 25 is spun, and dropped down upon the playing surface at any other point within the dividers 19 and radially inward thereof, the said spinner will normally gravitate to the centrally depressed portion 18 where it will continue to rotate until it stops.

The balls 23, of which three are showed for illustration, which can be varied in number, are adapted to be dropped down upon the playing surface at any point, normally radially inward of the dividers 19 which balls will gravitate or roll downwardly to the central depressed portion 18 and will operatively engage the shank portion 26 of the spinner with the edges 27 reactively engaging the said balls for projecting the same upwardly along the inclined playing surface 17 and 16 for random nesting respectively within some of the said depressions 21 or 22.

It is possible that all of the balls will go into the depressions 22, and at the same time some or all of the balls could actually pass through the respective spaces 20 between the dividers 19 and drop into the row of depressions 21, which hereinafter described scores a higher point for the player.

Referring to the drawing, it is seen that the depressions 21 and 22 are arranged in groups which designate as a part of the educational game apparatus certain mathematical functions, as for example, adding for groups 29, subtracting for group 30, adding double for group 31 and dividing in the groups 32. For example groups 32 show dividing by the numeral 2, whereas groups 33 for older children, show dividing by number 5.

The game board apparatus shown in FIG. 2 is designed for younger children, and the division by 5 is omitted. Also it is noted, as hereafter described that the indicia with respect to the game apparatus in FIG. 2 are of lower numbers, for easier handling for younger children.

Referring to FIG. 1, for illustration, the group of depressions designated at 29 are colored in blue, and the gameboard has the indicia ADD thereon adjacent the said group. There are additionally impressed, painted, or otherwise applied to the playing surface, in one of the groups 29, the numerals 70, 80, and 250.

The second group 29 also colored blue, has the indicia ADD shown, and also the additional indicia, namely the numerals 50, 60 and 200, as the values to be received by the player for balls which go in the identified individual depressions.

Because of the color designations which are applied to the various groups 29, 30, 31, 32 and 33, it is easy to ascertain what the mathematical function desired will be.

For example, groups 29 are shown in blue, which a child will always know means to ADD; group 31 is colored white, and the numerals are added after being doubled; the group 30, designated in red indicates SUBTRACTING, and the groups 32 and 33 indicated DIVISION, either by 2 or by 5.

*Report Card*

|  | Blue, ADD | White, ADD | Total | Red, SUB-TRACT | Balance | By 2 or 5 | DIVIDE | Total balance |
|---|---|---|---|---|---|---|---|---|
| Total each column | 80 | 80 | 160 |  | 160 |  |  | 160 |
| Down and mark | 50 | 80 | 130 | 10 | 120 |  |  | 120 |
| Total on bottom | 60 | 80 | 140 |  | 140 | 5 |  | 28 |
| Mark approval | 70 | 50 | 120 | 20 | 100 |  |  | 100 |
|  | 80 | 200 | 280 |  | 280 | 2 |  | 140 |
| By—A, B, C, D | 340 | 490 | 830 | 30 | 800 |  |  | 540 |

It is noted in each case that the numerical indicia is located closely adjacent the particular depression for easy recognition of the value to be achieved, when one of the balls 23 passes in a particular depression.

There is an additional group designated at 31 on the playing surface with indicia applied thereto, which reads ADD and DOUBLE, and in the depressions adjacent thereto, are colored white and there is an additional indicia applied to the playing surface for the numerals 30, 40 and 150 respectively, which are located adjacent the respective depressions, as shown in FIG. 1.

Another group is designated at 30, wherein the depressions 21 and 22 are colored red for identification, and wherein the indicia SUBTRACT is applied to the playing surface. There are additional markings on the playing surface, namely the numerals 10, 20 and 100, adjacent the respective depressions for numerical identification thereof.

There is also shown at the points 32 in FIG. 1, as well as in FIG. 2, the additional repressions 21, which are colored yellow, for illustration, with indicia thereon indicating DIVIDE BY and with the numerals 2 adjacent the said depressions.

There are additional groups indicated at 33, shown only in FIG. 1, for older players, or more experienced players, wherein provision is made to divide by 5 and with the gameboard so marked. This division by 5 is omitted from the gameboard shown in FIG. 2, which is for younger children.

OPERATION

The toy is played as follows:

Spin the top 24—25 at the center 18 of the tapered playing surface 17 and drop the balls 23 until each ball (3 or more) on impingement with the edges 27 of the spinner project into one or more of the holes or depressions 21—22, painted with different colors. Some depressions are marked RED at 30, WHITE at 31, BLUE at 29 and YELLOW at 32 and 33. The object of the game is to add the values corresponding to the balls in the particular depressions in groups 29, adding also thereto any balls in the group 31 with the player observing the requirement that the numerical designation be doubled. These numerals are marked upon a score card.

Furthermore, the numerals designated in group 30 are subtracted from the total if balls have dropped into any of these apertures or depressions corresponding to group 30; and as a final operation the total score is divided by the results indicated from any balls which may have dropped into the groups 32 or 33, as the case may be.

A specimen report card is shown hereunder, wherein the players apply their various scores, as indicated, for illustration.

DESCRIPTION

*Directions for playing educational toy.*—Play further the number of times you decided, which could be 5 or 10 times or more; when the total is added up, the one who has the largest amount, is the winner. A tab may be used for keeping score.

This game may be played anywhere, such as schools, in the home—and the child in this manner may earn an allowance by keeping tab as to his scores—to be checked by the parent on the report card, and approved by the parent, with grades marked such as A, B, C, and D, depending upon the results and the score. For example, it may be so played so that getting a mark of C or D, the child could lose his allowance.

Parents also would enjoy this toy with the children for the development of their minds; i.e., something every home should have where there is one or more children from the first grade to the eighth grade. The first grade studying six months knows it all—does your child in the 4th or 5th grade know it? You can find out for yourself—all this for the good of your child as an educational toy.

Having described my invention, reference should now be had to the following claims.

I claim:

1. A game comprising a plurality of identical size balls; a circular, horizontally arranged base having an upstanding continuous annular rim along its upper peripheral edge to form a circular, continuous outer wall; the upper surface of the base forming a playing surface which is uniformly sloped upwardly in all radial directions from its center up to the outer wall; a circular inner wall formed on and extending upwardly from the playing surface and arranged within the circumference of and parallel to the outer wall and being uniformly spaced from the outer wall a distance which is only slightly greater than the diameter of a ball so that a ball may roll between the walls on a circumferential path relative to the center of the base and will come to rest in one of the depressions in its rolling path; an outer series of equally spaced apart hemispherically shaped depressions formed in the playing surface, each depression being equally spaced between the two walls, the depressions together forming a complete circle composed of regularly radially spaced apart receptacles for receiving balls; an inner series of hemispherically shaped depressions formed in the playing surface closely adjacent to but within the circumference of the inner wall and together forming a complete circle of regularly radially spaced apart ball receiving receptacles parallel to the outer series circle and the inner wall, with each of the depressions of the inner series being located on a radius which is equidistantly spaced between the two radii on which are located two adjacent depressions of the outer series depressions, there being the same number of depressions in each series; the inner wall being formed with radially directed gaps forming openings which extend upwardly from the plane of the playing surface to the upper edge of the inner wall, each gap being radially aligned with an outer series depression and being of a width which is only slightly greater than the diameter of a ball so that a radially directed ball may roll therethrough; a manually rotatable spinner, having a series of spaced upright edges, arranged for manually actuated rotation at the depressed center of the playing surface for striking the balls and directing them to roll into various of the depressions, there being less balls than there are depressions; identification means identifying the depressions into groups, and including indicia indicating a mathematical value and mathematical function for each of the depressions in each group, for computing the mathematical values of the depressions which receive a ball in any one game into a game score.

2. A game comprising a plurality of identical size balls; a circular, horizontally arranged base having an upstanding continuous annular rim along its upper peripheral edge to form a circular, continuous outer wall; the upper surface of the base forming a playing surface which is uniformly sloped upwardly in all radial directions from its center up to the outer wall; a circular inner wall formed on and extending upwardly from the playing surface and arranged within the circumference of and parallel to the outer wall and being uniformly spaced from the outer wall a distance which is only slightly greater than the diameter of a ball so that a ball may roll between the walls on a circumferential path relative to the center of the base and will come to rest in one of the depressions in its rolling path; an outer series of equally spaced apart hemispherically shaped depressions formed in the playing surface, each depression being equally spaced between the two walls, the depressions together forming a complete circle composed of regularly radially spaced apart receptacles for receiving balls; an inner series of hemispherically shaped depressions formed in the playing surface closely adjacent to but within the circumference of the inner wall and together forming a complete circle of regularly radially spaced apart ball receiving receptacles parallel to the outer series circle and the inner wall; the inner wall being formed with radially directed gaps forming openings which extend upwardly from the plane of the playing surface of the upper edge of the inner wall, each gap being radially aligned with an outer series depression and being of a width which is only slightly greater than the diameter of a ball so that a radially directed ball may roll therethrough; a manually rotatable spinner, having a series of spaced upright edges, arranged for manually actuated rotation at the depressed center of the playing surface for striking the balls and directing them to roll into various of the depressions, there being less balls than there are depressions; and identifying indicia arranged adjacent said depressions for computing a game score.

References Cited in the file of this patent

UNITED STATES PATENTS

| | | |
|---|---|---|
| 552,694 | McGee | Jan. 7, 1896 |
| 1,028,467 | Kaerschke | June 4, 1912 |

FOREIGN PATENTS

| | | |
|---|---|---|
| 15,399 | Austria | Mar. 10, 1904 |
| 32,501 | Denmark | Nov. 5, 1923 |
| 745,799 | France | Feb. 21, 1933 |